US007018708B2

(12) United States Patent
Song et al.

(10) Patent No.: US 7,018,708 B2
(45) Date of Patent: Mar. 28, 2006

(54) GLOSS-COATED PAPER WITH ENHANCED RUNNABILITY AND PRINT QUALITY

(75) Inventors: Jay C. Song, Highland Mills, NY (US); Jacob P. John, Loveland, OH (US); Sen Yang, Nanuet, NY (US); Timothy J. Bradford, Killen, AL (US)

(73) Assignee: International Paper Company, Stamford, CT (US)

(*) Notice: Subject to any disclaimer, the term of this patent is extended or adjusted under 35 U.S.C. 154(b) by 26 days.

(21) Appl. No.: 10/643,696

(22) Filed: Aug. 18, 2003

(65) Prior Publication Data

US 2004/0197496 A1 Oct. 7, 2004

Related U.S. Application Data

(60) Provisional application No. 60/405,515, filed on Aug. 22, 2002.

(51) Int. Cl.
*B32B 23/96* (2006.01)

(52) U.S. Cl. ...................... 428/327; 428/328; 428/329; 428/330; 428/331; 428/514

(58) Field of Classification Search ................ 428/327, 428/328, 329, 330, 331, 514
See application file for complete search history.

(56) References Cited

U.S. PATENT DOCUMENTS

| | | | |
|---|---|---|---|
| 4,198,471 A | 4/1980 | Nelson | |
| 4,301,210 A | 11/1981 | Yasuda et al. | |
| 4,317,849 A | 3/1982 | Ogura et al. | |
| 4,778,711 A | 10/1988 | Hosomura et al. | |
| 5,254,403 A | 10/1993 | Malhotra | |
| 5,360,657 A | 11/1994 | Kano et al. | |
| 5,690,728 A | 11/1997 | Ravishankar | 106/416 |
| 5,846,637 A | 12/1998 | Malhotra et al. | |
| 5,952,082 A | 9/1999 | Normington et al. | |
| 5,965,315 A | 10/1999 | Fujii et al. | |
| 2002/0088587 A1 | 7/2002 | Munchow | 162/189 |

FOREIGN PATENT DOCUMENTS

| | | |
|---|---|---|
| EP | 1 045 068 A2 | 10/2000 |
| WO | WO 01/59215 | 9/1994 |
| WO | WO 0040424 | 7/2000 |
| WO | WO 01/55793 | 8/2001 |

*Primary Examiner*—D. S. Nakarani
(74) *Attorney, Agent, or Firm*—Thomas W. Barnes, III

(57) ABSTRACT

This invention provides a gloss-coated electrophotographic paper with superior runnability and print quality in colour and monochrome copiers and printers. The coated paper product comprises a paper substrate coated on at least one side with a pigmented coating. The pigment coating consists of a mixture of at least three different pigments and a binder. The coating may further include a lubricant. Optionally, the coating formulation may contain an optical brightening agent, a defoamer and a thickener. In addition, the gloss coated electrophotographic paper of this invention provides a superior toner adhesion in colour and monochrome electrophotographic imaging applications.

28 Claims, No Drawings

GLOSS-COATED PAPER WITH ENHANCED RUNNABILITY AND PRINT QUALITY

This application claims the benefit of U.S. Provisional Application Ser. No. 60/405,515 filed on Aug. 22, 2002, which is incorporated herein by reference.

FIELD OF THE INVENTION

The present invention relates to gloss-coated electrophotographic paper that gives superior copier runnability and print quality. In particular, a paper substrate coated on at least one surface with a pigmented coating comprising a mixture of at least three different pigments and a binder is provided.

BACKGROUND OF THE INVENTION

Gloss-coated papers suitable for electrophotographic printing are in demand due to their superior image quality and toner adhesion properties as compared to uncoated paper grades. The surface of a gloss-coated sheet is very smooth as a result of calendering operation. The high smoothness is attributed to many advantageous imaging performances, however, it also presents challenges for the runnability of gloss coated paper in sheet-fed digital equipment such as color copiers and laser and color laser printers. Coated papers are also more susceptible to blistering due to high fusing temperatures in colour copiers and even some high-speed black and white copiers. The following coated paper designs have been proposed in the literature.

WO 00/40424 discloses a multi-layer coated copy paper, which has a thermal insulating layer, between the base paper layer and the outer topcoat layer. The thermal insulating layer contains from 10% to 70% calcium carbonate, from 90% to 30% fully or partially calcined clay and from 0% to 30% satin white with a binder.

U.S. Pat. No. 4,301,210 discloses a high quality cast coated paper with an aqueous undercoat layer and an aqueous overcoat layer. The undercoat layer was applied using a blade coating, The overcoat layer was applied using a cast coating method. The overcoat layer contains a polymer latex with a glass transition temperature of 38 degree Celsius or higher. The overcoat was dried at temperature below the glass transition temperature of the polymer latex. A glossy finish was obtained by subjecting the overcoat surface to mirror finish treatment at a temperature higher than the glass transition temperature of the polymer latex.

U.S. Pat. No. 4,317,849 discloses a high-gloss coated paper with an aqueous coating comprising a synthetic polymer latex (A) having a glass transition temperature of at least 38 degree Celsius and a synthetic polymer latex (B) having a glass transition temperature of 5 to 25 degree Celsius. The weight ratio of A to B is from 1/0.1 to 1/1. The coated surface was subjected to hot roll calendering at temperatures higher than the glass transition temperature of polymer latex A.

U.S. Pat. No. 5,360,657 discloses a process to produce coated printing paper by first applying a pigment coating layer and applying a thermal plastic latex with a second order transition temperature of at least 80 degrees Celsius and an average particle size of smaller than 100 nm. High gloss is obtained by adding lubricants to the surface layer and calendering at 10 to 30 degree Celsius.

EP 1 045 068 A2 discloses a coated paper product having high gloss and brightness. The paper substrate is coated on at least one side with an aqueous coating formulation comprising an effective amount (14–35% by weight) of a plastic pigment and finished in a supercalender device.

U.S. Pat. No. 5,965,315 discloses a transfer sheet for electrophotography, which comprises a substrate coated with a porous resin-containing layer. The coated layer has a surface average pore diameter of 0.5 to 50 micrometer. The transfer sheet is said to be capable of eliminating mottles and dots and minimum gloss contrast between the blank portion and the image portion.

U.S. Pat. No. 5,254,403 discloses a recording sheet which comprises a substrate and an image receiving layer comprising a mixture of (a) a polymer capable of forming a latex, (b) a polysaccharide; and (c) a polymer containing oxyalkylene monomers. The recording sheets are suitable to use in both inkjet and electrophotographic imaging processes.

U.S. Pat. No. 5,952,082 discloses a coated paper particularly suitable for electrophotographic copying. The coated paper has a given basis weight with proportionally less coating and proportionally more fiber than conventional coated paper made for electrophotographic processes. The coated sheet is calendered to achieve a TAPPI 75 degree gloss value of about 45. The coated paper is said to have good fusing of dried toner on the paper at marginally lower temperatures. The typical properties are as follows: 45 gloss; 87 brightness, 91.5 opacity (for 70 # paper); and 2.1–2.3 Parker Print Smoothness.

U.S. Pat. No. 4,198,471 discloses a coated printing paper using a pigment system comprising a combination of a thermoplastic polymer and a thermosetting polymer. The amount of thermoset is preferably at least about 25% by weight of the pigment solids to provide improved ink receptivity and paper gloss. The amount of the thermoset is preferable below 75% by weight of the pigment solids so that the finished printing paper has a Gardner 75 degree gloss of at least about 40, using a calendering pressure of less than 500 PLI.

U.S. Pat. No. 5,846,637 discloses a coated xerographic photographic paper comprised of (1) a cellulosic substance; (2) a first antistatic coating layer in contact with one surface of the substrate: (3) a second toner receiving coating on top of the antistatic layer; and (4) a third traction controlling coating in contact with the back side of the substrate.

U.S. Pat. No. 4,778,711 discloses a coated electrophotographic image transfer paper that reduces blistering during fixing. The coated electrophotographic image transfer paper has a center-line-average surface roughness of not more that 2.0 micrometer and air permeability of less than 4,000 seconds.

None of the coating designs in the prior arts overcomes the shortcomings of blistering, feeding jams in high-speed copiers. The objective of the present invention is to address these performance shortcomings of coated electrophotographic paper.

SUMMARY OF THE INVENTION

An objective of this invention is to provide a gloss-coated paper with superior runnability in electrophotographic copiers and printers. An objective is also to achieve a superior image quality and improved blister resistance. The coated paper product comprises a paper substrate coated on at least one side with a pigmented coating. The pigmented coating has a glossy finish as well as a rough surface that provides paper with enhanced runnability.

In an alternate embodiment the pigmented coating can be applied to both sides of the paper substrate surface.

The pigmented coating consists of a mixture of at least three different pigments and a binder. In an alternate embodiment four different pigments are included in the coating composition. In yet another embodiment five different pigments are included in the coating composition. In still another embodiment six different pigments are included in the coating composition.

Additionally, a lubricant such as calcium stearate is added to the coating composition mixture. Optionally, the coating formulation may contain an optical brightening agent, a defoamer and a thickener.

The pigment mixture contains pigment particles selected from the group including calcium carbonates, clay, plastic pigments, $TiO_2$, calcined clay and polymethyl methacrylate beads. The binder resin blend is selected from the group consisting of vinyl acetate acrylate, styrene acrylate and styrene butadiene acrylic copolymers. The glass transition temperature of the binder resin is from −5 to 30 degrees Celsius. The Scott internal bond of the gloss coated EP paper is from 150 to 500. The Parker Print Surface is in the range of 0.80–2.0. The delta coefficient of friction is in the range of 0.06 to 0.20. In addition, the gloss coated electrophotographic paper of this invention provides a superior toner adhesion in colour and monochrome electrophotographic imaging applications.

The coated electrophotographic paper of this invention provides a TAPPI 75-degree gloss is in the range of 45–85%. Moreover, the coated electrophotographic paper of this invention exhibits high blister resistance.

DETAILED DESCRIPTION OF THE INVENTION

This invention provides a gloss-coated paper for electrophotographic printing with superior runnability and image quality. The selection of coating substrate is important since the properties of the substrate can affect the performance of the coated product.

High Scott internal bond values are preferred since paper substrates with high Scott internal bond values are beneficial to the blister resistance of the coated paper. The Scott Internal bond test measures the energy required to rapidly delaminate a sheet-type specimen. Scott Internal bond value correlates will with paper structural failures such as surface picks, blistering or delaminations within the interior of the sheet. The TAPPI test method for Scott Internal bond test is T569 pm-00. Specifically, the preferred range for the Scott Internal Bond values of the invention are in the range of 150 to 500. Since the brightness of the coated paper depend to a large extent on the brightness of the substrate paper, to achieve high brightness in the final product, the brightness of the base paper needs to be reasonably high.

The formation index of the base paper is preferably be greater than 70. Base papers with low values of formation index are not uniform in paper properties. A paper substrate with uneven porosity value across the sheet is more susceptible to formation of gloss mottle. In addition, the electrical properties of the base paper are critical for the control of static and electrostatic imaging transfer process. If the surface resistivity is too high, excessive static charge can be built which may lead to multiple feed and copier jam. However, if the surface resistivity is too low, or the conductivity of the paper surface is too high, incomplete toner transfer can occur. Therefore the surface resistivity properties should be carefully controlled. Typically, the surface resistivity of the base paper is in the range from $1\times10^{10}$ ohms/square to $1\times10^{12}$ ohms/square before application of the invention coating.

The binder resin for the pigment coating is selected from the group consisting of vinyl acetate acrylate copolymers, styrene acrylate latex, and styrene butadiene copolymers. Since a large percentage of pigments are used in the coating formulation, the binding strength of the binder resin should be sufficient to provide good toner adhesion. The binder resins must possess excellent adhesion properties that can bind well the pigment and the toner particles. If the binder resins do not have sufficient binding strength, poor toner adhesion and even fuser tacking can occur. In addition, binder resins must be able to facilitate the glossing of the coating finish. One important parameter for selecting the binder resin is the glass transition temperature. The preferred range of the glass transition temperatures of the binder resins is between −5 degrees Celsius to 30 degrees Celsius. Examples of vinyl acetate acrylate copolymers include Resyn 25-1155, Resyn 25-1151 which are both commercially available from National Starch and Chemical Company, Bridgewater, N.J.; Airflex 100HS, Airflex 110, Airflex 144, Airflex 192, Airflex 315, Airflex 460, Airflex 1082, Airflex EN1165 which are all commercially available from Air Products and Chemicals, Inc, Allentown, Pa. Examples of styrene acrylates and styrene butadiene acrylic copolymers include Acronal resins commercially available from BASF, Mount Olive, N.J.; XU 31301.50., XU 31314.50. XU 31334.50, and XU 31258.50 commercially available from Dow Chemical Company, Midland, Mich.; Gencryl resins and Gencote resins commercially available from Omnova Solutions, Inc., Mogadore, Ohio. The amount of binder in the coating is generally from about 8 weight % to about 20 weight % based on the total weight of the coating. The amount of binder in the coating is preferably from about 9 weight % to about 15 weight %.

Illustrative of suitable pigments are Kaolin clay; calcined clay, calcium carbonates; satin white; titanium dioxide, silica, talc, alumina silicates, aluminum trihydrates, plastic pigment and polymethyl methacrylate beads. High brightness pigments are preferred for achieving high brightness in the coating finish. Preferred pigments are ground and precipitated calcium carbonates, calcined clay, Kaolin clay, titanium dioxide, plastic pigment, and aluminum trihydrate.

The pigmented coating consists of a mixture of at least three different pigments and a binder. In an alternate embodiment four different pigments are included in the coating composition. In yet another embodiment five different pigments are included in the coating composition. In still another embodiment six different pigments are included in the coating composition.

The size of the pigment particles are in the range of 0.1 microns to 2 microns for Kaolin clay; calcined clay, calcium carbonates; satin white: titanium dioxide, silica, talc, alumina silicates, aluminum trihydrates, and plastic pigment. The particle size for the polymethyl methacrylate beads are in the range of 5–50 microns.

The total amount of pigment in the coating is generally from about 50 weight % to about 90 weight % based on the total weight of the coating. The amount of pigment in the coating is preferably from about 60 weight % to about 85 weight %. The pigment mixture can be formulated on the basis of performance optimisation of the coated paper. In this invention, the amount of calcium carbonate is from 25 weight % to 75 weight % based on the dry weight of the total pigment. The amount of clay can be from 20 weight % to 70 weight % based on the dry weight of the total pigment. The amount of calcined clay is from 2 weight % to 10 weight % based on the dry weight of the total pigment. The amount of titanium dioxide is from 1 weight % to 5 weight % based on the dry weight of the total pigment. The amount of plastic pigment is from 2 weight % to 10 weight % based on the dry weight of the total pigment. The amount of polymethyl methacrylate beads, if used in the invention, is present in amounts up to 2.0 weight % based on the dry weight of the total pigment.

In addition to the mixture of pigment and binder in the invention coating is the presence of a lubricant selected from the group containing calcium stearate, triglyceride emulsion wax emulsions, polyethylene and polypropylene glycols. Preferably calcium stearate is the lubricant incorporated into the invention coatings.

The coated paper according to the invention has a Parker Print Surface in the range of 0.8–2.0. Parker Print Surface measures the roughness of the paper surface under conditions intended to simulate the nip pressures and backing substrates in printing processes. The lower the Parker print Surface value, the smoother the paper surface. The TAPPI standard test method for Parker Print Surface is T 555 om-99.

The coated paper of the invention preferably has a delta coefficient of friction in the range of 0.06 to 0.20. The coefficients of static and kinetic friction test method measures the coefficients of static and kinetic friction of the paper measured when sliding against itself. The coefficient of static friction relates to the force required to initiate movement between two surfaces. The coefficient of kinetic friction relates to the force required to cause continuation of the movement at a uniform speed. The TAPPI standard test method number is T549 pm-90.

The coated paper provides enhanced toner adhesion in colour and monochrome electrophotographic imaging applications.

The coated paper has a TAPPI 75-degree gloss is in the range of 45–85%. This method measures the specular gloss of the paper at 75 degree or 15 degree from the plane of the paper. It tells the degree of shininess of the paper surface. The glossier the paper surface, the higher the gloss value. The TAPPI standard test method number is T480 om-99.

The following Examples will serve to illustrate the invention. These examples are merely representative and are not inclusive of all the possible embodiments of the invention. They are offered to describe particular embodiments of the invention but are not meant to be in any sense limiting.

EXAMPLE 1

A coating composition was prepared according to the following formulation:

| | |
|---|---|
| Ground calcium carbonate(1) | 43 parts |
| Kaolin clay(2) | 44 parts |
| Calcined clay(2) | 5 parts |
| Titanium dioxide | 3 parts |
| Plastic pigment(3) | 5 parts |
| Carboxylated styrene butadiene copolymer latex(4) | 12 parts |
| Ethylated starch | 3 parts |
| Calcium stearate | 2 parts |
| Lucophore CE liquid(5) | 2.5 parts |
| Thickener(6) | 0.4 parts |
| Defoamer(7) | 0.2 parts |

(1)Supllied by OMYA, 61 Main Street, Proctor, VT 05765
(2)Supplied by IMERYS, Roswell, GA 30076
(3)Supplied by Dow Chemicals Company, Midland, Michigan 48674
(4)Supplied by Dow Chemical Company, Midland, Michigan 48674
(5)Supplied by Clariant, Martin, South Carolina 29836
(6)Supplied by Rhom Haas Chemical Company, Charlotte, NC 28216
(7)Supplied by Ashland Chemical Company, Drew Industrial Division, Boonton, NJ 07005.

The coating composition was applied on 90 gsm base paper on a pilot blade coater with a coating weight of about 14 gsm per side. The coated roll was super-calendered at the following conditions: Temperature: 100 degrees Celsius; Pressure: 185–250 kN/m; Speed: 500 meters per minute; Number of Nips: 12.

The physical properties of the coated paper are described in Table I below.

TABLE I

| | |
|---|---|
| Basis weight, gsm | 120 |
| Caliper, mil | 4.2 |
| GE brightness, % | 89 |
| 75 degree gloss, % | 73 |
| Formation index, Kajaani | 105 |
| Opacity, % | 94.2 |
| Surface resistivity, ohms/square | $6 \times 10^{10}$ |
| Volume resistivity, ohms/square | $1.1 \times 10^{10}$ |
| Parker smoothness, 10 $kgf/cm^2$ | 1.2/1.3 |
| Scott internal bond, 1 $E^{-3}$ ft * $lb/in^2$ | 260 |
| COF: Static | 0.40 |
| COF: Kinetic | 0.29 |
| Delta COF | 0.11 |

EXAMPLE 2

A coating composition was prepared according to the following formulation:

| | |
|---|---|
| Precipitated calcium carbonate(1) | 69 parts |
| Capim DG(2) | 20 parts |
| Calcined clay(3) | 5 parts |
| Plastic pigment(4) | 5 parts |
| Vinyl acrylic copolymer(5) | 12 parts |
| Ethylated starch | 3 parts |
| Calcium stearate | 2 parts |
| Leucophore CE liquid(6) | 2.5 parts |
| Thickener(7) | 0.4 parts |
| Defoamer(8) | 0.2 parts |

(1)Supplied by IMERYS, Roswell, GA 30076
(2)Supplied by IMERYS, Roswell, GA 30076
(3)Supplied by IMERYS, Roswell, GA 30076
(4)Supplied by Rhom Haas Chemical Company, Charlotte, NC 28216
(5)Supplied by National Starch and Chemical Company, Bridgewater, NJ 08807
(6)Supplied by Clariant, Martin, South Carolina 29836
(8)Supplied by Rhom Haas Chemical Company, Charlotte, NC 28216
(9)Supplied by Ashland Chemical Company, Drew Industrial Division, Boonton, NJ 07005.

The coating composition was applied on 90 gsm base paper on a pilot blade coater with a coating weight of about 14 gsm per side. The coated roll was super-calendered at the following conditions: Temperature: 100 degrees Celsius; Pressure: 185–250 kN/m; Speed: 500 meters per minute; Number of Nips: 12.

The physical properties of the coated paper are described in Table II below.

TABLE II

| | |
|---|---|
| Basis weight, gsm | 120 |
| Caliper, mil | 4.2 |
| GE brightness, % | 89 |
| 75 degree gloss, % | 73 |
| Formation index, Kajaani | 105 |
| Opacity, % | 94.2 |
| Surface resistivity, ohms/square | $6 \times 10^{10}$ |
| Volume resistivity, ohms/square | $1.1 \times 10^{10}$ |
| Parker smoothness, 10 $kgf/cm^2$ | 1.2/1.3 |
| Scott internal bond, 1 $E^{-3}$ ft * $lb/in^2$ | 260 |
| COF: Static | 0.40 |
| COF: Kinetic | 0.29 |
| Delta COF | 0.11 |

EXAMPLE 3

A coating composition was prepared according to the following formulation

| | |
|---|---|
| Precipitated calcium carbonate(1) | 69 parts |
| Capim DG(2) | 20 parts |
| Calcined clay(3) | 5 parts |
| PMMA beads(4) | 1 parts |
| Plastic pigment(5) | 5 parts |
| Vinyl acrylic copolymer(6) | 12 parts |
| Ethylated starch | 3 parts |
| Calcium stearate | 1 parts |
| Optical brightener(7) | 2.5 parts |
| Thickener(8) | 0.4 parts |
| Defoamer(9) | 0.2 parts |

(1)Supplied by IMERYS, Roswell, GA 30076
(2)Supplied by IMERYS, Roswell, GA 30076
(3)Supplied by IMERYS, Roswell, GA 30076
(4)Supplied by Esprix technologies, Sarasota, FL 34243
(5)Supplied by Rhom Haas Chemical Company, Charlotte, NC 28216
(6)Supplied by National Starch and Chemical Company, Bridgewater, NJ 08807
(7)Supplied by Clariant, Martin, South Carolina 29836
(8)Supplied by Rhom Haas Chemical Company, Charlotte, NC 28216
(9)Supplied by Ashland Chemical Company, Drew Industrial Division, Boonton, NJ 07005.

The coating composition was applied on 24# paper with a laboratory blade coater with a coating weight of about 5 lb per side. The coated paper was calendered at the following conditions: Temperature: 150 degrees F.; Pressure: 1,500 PSI; Speed: 25 fpm; Number of Nips: 2.

The physical properties of the coated paper are described in Table III below.

TABLE III

| | |
|---|---|
| Basis weight, gsm | 108 |
| Caliper, mil | 3.8 |
| GE brightness, % | 95 |
| 75 degree gloss, % | 68 |
| Formation index, Kajaani | 115 |
| Opacity, % | 94 |
| Surface resistivity, ohms/square | $5 \times 10^{11}$ |
| Volume resistivity, ohms/square | $2 \times 10^{11}$ |
| Parker smoothness, 10 $kgf/cm^2$ | 0.92 |
| Scott internal bond, 1 $E^{-3}$ ft * $lb/in^2$ | 108 |
| COF: Static | 0.28 |
| COF: Kinetic | 0.36 |
| Delta COF | 0.08 |

EXAMPLE 4

A coating composition was prepared according to the following formulation

| | |
|---|---|
| Ground calcium carbonate(1) | 43 parts |
| Kaolin clay(2) | 44 parts |
| Calcined clay(3) | 5 parts |
| Titanium dioxide | 3 parts |
| PMMA beads(4) | 1 parts |
| Plastic pigment(5) | 5 parts |
| Carboxylated styrene butadiene copolymer latex(6) | 12 parts |
| Ethylated starch | 3 parts |
| Calcium stearate | 2 parts |
| Lucophore CE liquid(5) | 2.5 parts |

-continued

| | |
|---|---|
| Thickener(6) | 0.4 parts |
| Defoamer(7) | 0.2 parts |

(1)Supplied by OMYA, 61 Main Street, Proctor, VT 05765.
(2)Supplied by IMERYS, Roswell, GA 30076.
(3)Supplied by Dow Chemicals Company, Midland, Michigan 48674.
(4)Supplied by Dow Chemical Company, Midland, Michigan 48674.
(5)Supplied by Clariant, Martin, South Carolina 29836.
(6)Supplied by Rhom Haas Chemical Company, Charlotte, NC 28216.
(7)Supplied by Ashland Chemical Company, Drew Industrial Division, Boonton, NJ 07005.

The coating composition was applied on 24# paper with a laboratory blade coater with a coating weight of about 5 lb per side. The coated paper was calendered at the following conditions: Temperature: 150 degrees F.; Pressure: 1,500 PSI; Speed: 25 fpm; Number of Nips: 2.

The physical properties of the coated paper are described in Table IV below.

TABLE IV

| | |
|---|---|
| Basis weight, gsm | 110 |
| Caliper, mil | 3.87 |
| GE brightness, % | 92 |
| 75 degree gloss, % | 69 |
| Formation index, Kajaani | 120 |
| Opacity, % | 95 |
| Surface resistivity, ohms/square | $2.4 \times 10^{11}$ |
| Volume resistivity, ohms/square | $1.0 \times 10^{11}$ |
| Parker smoothness, 10 $kgf/cm^2$ | 0.83 |
| Scott internal bond, 1 $E^{-3}$ ft * $lb/in^2$ | 105 |
| COF: Static | 0.28 |
| COF: Kinetic | 0.36 |
| Delta COF | 0.08 |

EXAMPLE 5

The gloss coated sheets were evaluated on the following color laser printers including HP 4550 color laser printer, HP 8550 color laser printer, Xerox Phaser 850 color laser printer, Xerox 740/750 color laser printer, Xerox Phaser 560 color laser printer, and Ricoh Aficio 3800 color laser printer. Color copier runnability and print quality performance were evaluated on Xerox 5799 color copier, Xerox DocuColor 40 color copier, Canon CLC 1000 color copier, Xerox DocuColor 12 color copier and Oce 700 color copier. Excellent runnability and image quality were achieved. No blistering was observed. The coated paper samples were also tested on the monochrome copiers and printers including Xerox Docutech 135 and HP 8000 printer. The coated paper was also tested on the Indigo digital Offset press Ultrastream 2000 and Xeikon DCP 30 digital press. Excellent image quality and runnability were obtained.

Table V below summarizes the test results on color and monochrome printers and copiers.

TABLE V

COPIER PRINTER TEST RESULTS SUMMARY

| Sample | Runnability | Blister | Fuser Tack | Toner Adhesion |
|---|---|---|---|---|
| Example 1 (This Invention) | Excellent | None | None | Excellent |
| Example 2 (This Invention) | Excellent | None | None | Excellent |
| Commercial A | Poor | Yes | None | Excellent |
| Commercial B | Poor | Yes | None | Excellent |

Commercial samples A and B are gloss-coated papers that are currently available in the market place. Commercial sample "A" is gloss coated paper commercially available from the Xerox Corporation, and Commercial sample "B" is gloss coated paper commercially available from the Sappi Corporation.

The foregoing description of various and preferred embodiments of the present invention has been provided for illustration only, and it is understood and is apparent to one of ordinary skill in the art, that numerous modifications, variations and alterations may be made without departing from the scope and spirit of the invention as defined in the appended claims hereto.

What is claimed is:

1. A coated paper comprising a paper substrate coated on at least one side with a pigmented coating that provides a glossy coating surface having a TAPPI 75-degree gloss of from 45 to 85% as measured and a Parker Print Surface of from 0.8 to 2.0; wherein said pigmented coating comprises a mixture of at least three different pigments and a binder.

2. The coated paper according to claim 1, wherein at least four different pigments are present in said pigmented coating.

3. The coated paper according to claim 1, wherein at least five different pigments are present in said pigmented coating.

4. The coated paper according to claim 1, wherein at least six different pigments are present in said pigmented coating.

5. The coated paper according to claim 1, wherein said pigmented coating further comprises a lubricant.

6. The coated paper according to claim 1, wherein said pigments are selected from the group consisting of calcium carbonates, clay, plastic pigments, titanium oxide, calcined clay, satin white, silica, alumina silicates, talc, aluminum trihydrates and polymethyl methacrylate beads.

7. The coated paper according to claim 1, wherein said pigments are selected from the group consisting of calcium carbonates, clay, plastic pigments, titanium oxide and calcined clay, all having particle sizes in the range of 0.1 to 2 microns.

8. The coated paper according to claim 1, wherein said pigment is polymethyl methacrylate beads having particle sizes in the range of 5 to 50 microns and is present in amounts up to 2 weight % based on the dry weight of the total pigment.

9. The coated paper according to claim 1, wherein said binder is selected from the group consisting of vinyl acetate acrylate, styrene acrylate and styrene butadiene acrylic copolymers.

10. The coated paper according to claim 1, wherein said binder has a glass transition temperature in the range of −5 to 30° C.

11. The coated paper according to claim 1, wherein the Scott internal bond of the coated paper is in the range of 150 to 500.

12. The coated paper according to claim 1, wherein the delta coefficient of friction of the coated paper is in the range of 0.06 to 0.20.

13. The coated paper according to claim 1, wherein the coated paper provides enhanced toner adhesion in colour and monochrome electrophotographic imaging applications.

14. The coated paper according to claim 1, wherein the coated paper has high blister resistance.

15. The coated paper according to claim 1, wherein said paper substrate has a formation index greater than 70.

16. The coated paper according to claim 1, wherein said paper substrate has a surface resistivity in the range from $1\times10^{10}$ ohms/square to $1\times10^{10}$ ohms/square.

17. The coated paper according to claim 1, wherein the total amount of pigments in the coating is from 50 to 90 weight % and the amount of binder in the coating is from 8 to 20 weight % based on the total weight of the coating.

18. The coated paper according to claim 17, wherein said pigments in said pigmented coating comprise calcium carbonate present from 25 to 75 weight %; clay present from 20 to 70 weight %; calcined clay present from 2 to 10 weight %; and plastic pigment present from 2 to 10 weight %, wherein the weight %'s are based on the dry weight of the total pigment.

19. The coated paper according to claim 17, wherein said pigment in said pigmented coating comprises titanium dioxide present from 1 to 5 weight % based on the dry weight of the total pigment.

20. The coated paper according to claim 1, wherein said pigmented coating is coated on both sides of said substrate.

21. The coated paper according to claim 1, wherein said pigmented coating is suitable for use in electrophotographic and offset printing.

22. The coated paper according to claim 1, wherein the coated paper has a TAPPI 75-degree gloss ranging from 68 to 85%.

23. A coated paper comprising a paper substrate coated on at least one side with a pigmented coating having a TAPPI 75-degree gloss of from 45 to 85% as measured and a Parker Print Surface of from 0.8 to 2.0; wherein said pigmented coating comprises a lubricant, a binder and at least four different pigments.

24. The coated paper according to claim 23, wherein said pigmented coating comprises: 25 to 75 weight % calcium carbonate; 20 to 70 weight % clay; 2 to 10 weight % calcined clay; and 2 to 10 weight % plastic pigment; wherein said weight %'s are based on the dry weight of the total pigment.

25. The coated paper according to claim 23, further comprising titanium oxide present in amounts of 1 to 5 weight % based on the dry weight of the total pigment.

26. The coated paper according to claim 23, further comprising polymethyl methacrylate beads present in amounts up to 2.0 weight % based on the dry weight of the total pigment.

27. The coated paper according to claim 23, wherein said binder is selected from the group consisting of vinyl acetate, styrene acrylate and styrene butadiene acrylic copolymers and is present in amounts of 8 to 20 weight % based on the total weight of the coating.

28. The coated paper according to claim 23, wherein the coated paper has a TAPPI 75-degree gloss ranging from 68 to 85%.

* * * * *